Jan. 29, 1929.

B. H. DREES 1,700,610

TOOL HOLDER AND TOOL

Filed July 8, 1925

INVENTOR.
Bernard H. Drees
By John Strehli
ATTORNEY.

Patented Jan. 29, 1929.

1,700,610

UNITED STATES PATENT OFFICE.

BERNARD H. DREES, OF CINCINNATI, OHIO.

TOOL HOLDER AND TOOL.

Application filed July 8, 1926. Serial No. 121,103.

The object of my invention is to produce a holder for tools and a tool to be held by said tool holder, which shall be cheap of manufacture, very simple in construction and highly efficient in use, which possesses a high degree of utility.

It is well known that in working on metal in a lathe, planer, shaper and machinery of a kindred type, it is necessary to use tools, which have differently formed and shaped cutting edges, in order to produce the different kinds of cuts necessary to fashion the piece of metal being worked upon to carry out a certain structure or design. As a rule, these tools and the elements which hold them in the machinery, are generally made integral, and by repeated sharpening, they soon wear down to a condition in which they cannot be used practically, and this metal, which is of an expensive character, is lost.

It is also very expensive to have a large number of these tools on hand at all times, for making the different cuts and impressions on the metal being worked upon. They are also very expensive, take up considerable room and are inconvenient in handling.

It is the object of my invention to obviate these difficulties by producing a holder into which separate tools are placed and held for doing work. It will be readily understood that in this way the holder for the tools is always of the same length and shape and all the tools are always held in the same way.

The tools themselves are small, and large numbers of them of varying styles can be forged into shape, and any one needed for the particular work to be done can be placed into the tool holder and held firmly and rigidly in position. When the work is done for which this particular tool was used, another style can be placed into the tool holder, after the one therein has been removed.

The tools in which the holder and tool are made integral are made by hand and are expensive, whereas my tool parts can be made as forgings and are cheap and handy.

The various advantages and features of my invention will readily become apparent upon reading the annexed specification and claim.

Figure 1:
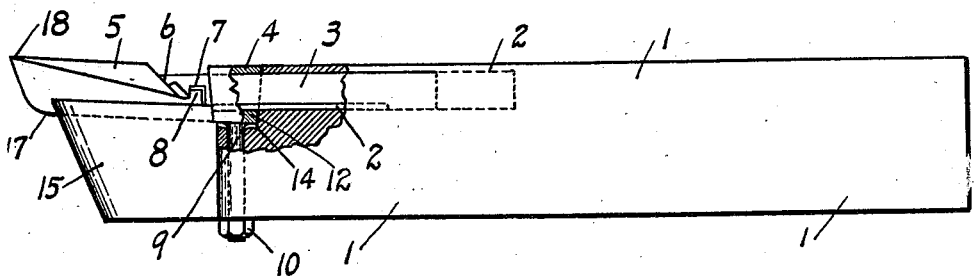
Figure 2:
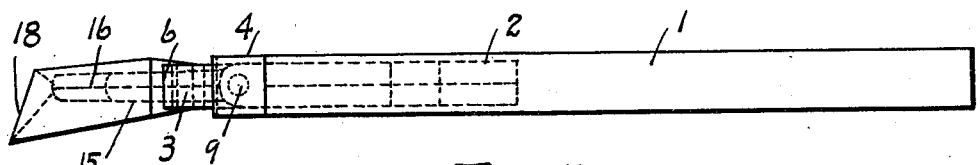
Figures 3, 4:
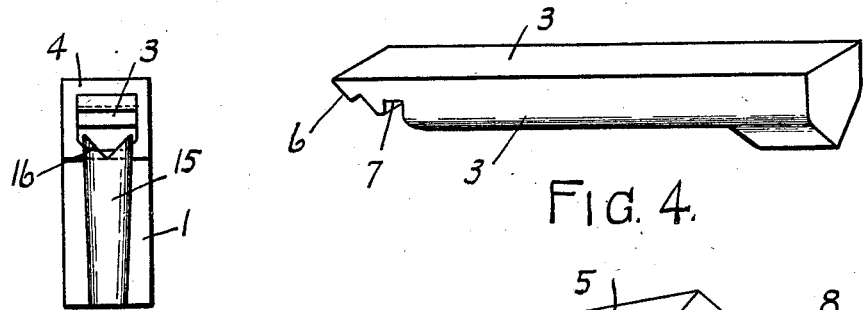
Figure 5:
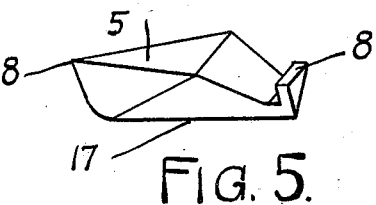
Figure 6:
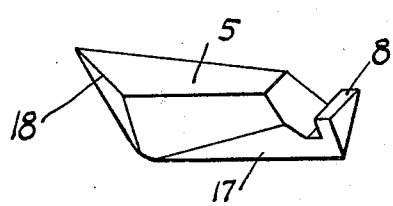
Figure 7:
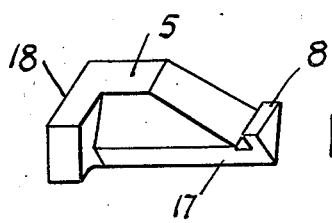

In the accompanying drawing, forming a part of this specification:

Fig. 1, is a side view of the tool holder showing one tool in position, parts broken away, to show construction, Fig. 2, is a plan view of device shown in Fig. 1, Fig. 3, is an enlarged front view with the tool removed, Fig. 4, is an enlarged isometric view of the tool holder, and Figs. 5, 6, and 7, are each isometric views of several of the different forms and shapes of tools to be used with the tool holder.

The tool holder is formed of the body part 1, having the recess 2, into which the tool holder element 3 slides and fits; this element also passes through the clamp 4, and bears against the tool 5 at the point 6, and the recess 7 of the element engages a tooth 8 of the tool 5. The clamp 4 has bolt 9 secured to its lower part and the nut 10, which bears against the lower edge 12, holds the element 3 firmly in position.

A recess 14 is provided in the body 1 to secure the clamp 4 against forward or backward play or movement, while the element 3 is held against any lateral movement or play by recess 2 in the body 1. This body 1 has a forward extension 15, having a groove 16, in which the V shaped portion 17, of the tool fits and rests and is held firm by the element 3 against play of any kind in any direction and is locked into position. In order to adjust the tool 5, the nut 10 is backed up, which will allow freedom to element 3 from clamp 4. The tool 5 is then placed in the groove 16, and under the element 3. The nut 10 is then drawn up tight, holding tool 5 firmly by portion 6, bearing down on said tool 5, through the clamp 4.

The tools shown in Figs. 5, 6, and 7, are the same in construction and contour at the clamping end so that they will all be interchangeable and all fit the same holder, while the cutting edges 18 can be of any desired shape or contour.

I have only described one form of tool holder, but I can change and modify same so long as the said changes and modifications fall within the scope of this specification and claim.

I can make any number of tools and have any kind or shape of cutting edge thereon, however the rear end of each tool is fashioned similarly in order that each one may fit the holding means and be locked into rigid operating position.

What I claim as new and my invention and desire to secure by Letters Patent is:

In a device of the character described, a tool holder having a guide hole, a groove, and a recess between the hole and groove, a clamping bolt having an apertured head working in the recess, a tool resting on the holder and having a projecting portion extending into said groove, a retainer extending through the apertured head of the bolt and slidable in said hole, and interlocking surfaces on the tool and retainer, adapted to be pressed into engagement by the bolt when the latter is tightened.

In testimony whereof, I affix my signature at the city of Cincinnati, county of Hamilton, and State of Ohio, this 30th day of June, 1926.

BERNARD H. DREES.